US012787134B2

(12) United States Patent
Li et al.

(10) Patent No.: US 12,787,134 B2
(45) Date of Patent: Nov. 3, 2026

(54) VEHICULAR CABIN MONITORING SYSTEM WITH LIGHT CONTROL BASED ON OCCUPANT LOCATION

(71) Applicant: Magna Electronics Inc., Auburn Hills, MI (US)

(72) Inventors: Haiquan Li, Rochester Hills, MI (US); Nan Wang, Röthenbach an der Pegnitz (DE); Christian Euler, Aschaffenburg (DE); Zhiliang Chen, Ulm (DE)

(73) Assignee: Magna Electronics Inc., Auburn Hills, MI (US)

( * ) Notice: Subject to any disclaimer, the term of this patent is extended or adjusted under 35 U.S.C. 154(b) by 99 days.

(21) Appl. No.: 18/904,108

(22) Filed: Oct. 2, 2024

(65) Prior Publication Data

US 2025/0113418 A1 Apr. 3, 2025

Related U.S. Application Data

(60) Provisional application No. 63/587,471, filed on Oct. 3, 2023.

(51) Int. Cl.

| | |
|---|---|
| ***H05B 45/12*** | (2020.01) |
| ***B60Q 3/72*** | (2017.01) |
| ***B60R 21/015*** | (2006.01) |
| ***G01J 1/42*** | (2006.01) |
| ***H05B 47/11*** | (2020.01) |

(Continued)

(52) U.S. Cl.

CPC ............... *H05B 45/12* (2020.01); *B60Q 3/72* (2017.02); *B60R 21/01534* (2014.10); *B60R 21/01538* (2014.10); *B60R 21/01552* (2014.10); *G01J 1/4204* (2013.01); *H05B 47/11* (2020.01);

(Continued)

(58) Field of Classification Search

CPC ...... H05B 45/12; H05B 47/11; H05B 47/125; H05B 47/155; B60Q 3/72; B60R 21/01534; B60R 21/01538; B60R 21/01552; B60R 2300/8006; G01J 1/4204

See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |

(Continued)

FOREIGN PATENT DOCUMENTS

| | | | |
|---|---|---|---|
| WO | 2023220222 | A1 | 11/2023 |

*Primary Examiner* — Daniel D Chang

(74) *Attorney, Agent, or Firm* — HONIGMAN LLP

(57) ABSTRACT

A vehicular cabin monitoring system includes a camera disposed within a cabin of a vehicle. Image data captured by the camera is transferred to and is processed at an electronic control unit (ECU). A light emitter that, when electrically operated to emit nonvisible light, illuminates at least a portion of the interior cabin that is viewed by the camera with nonvisible light. The vehicular cabin monitoring system, via processing at the ECU of image data captured by the camera and transferred to the ECU, determines illuminance of nonvisible light at a region of interest within the illuminated portion of the interior cabin that is viewed by the camera. The vehicular cabin monitoring system, responsive to determining that the illuminance of nonvisible light at the region of interest is greater than a threshold illuminance, reduces intensity of nonvisible light emitted by the light emitter.

38 Claims, 12 Drawing Sheets

(51) Int. Cl.
*H05B 47/125* (2020.01)
*H05B 47/155* (2020.01)

(52) U.S. Cl.
CPC ......... *H05B 47/125* (2020.01); *H05B 47/155* (2020.01); *B60R 2300/8006* (2013.01)

(56) References Cited

U.S. PATENT DOCUMENTS 5,949,331 A 9/1999 Schofield et al.
7,038,577 B2 5/2006 Pawlicki et al.
7,720,580 B2 5/2010 Higgins-Luthman
7,855,755 B2 12/2010 Weller et al.
7,914,187 B2 3/2011 Higgins-Luthman et al.
9,405,120 B2 8/2016 Graf et al.
10,017,114 B2 7/2018 Bongwald
10,065,574 B2 9/2018 Tiryaki
10,958,830 B2 3/2021 Koravadi
11,518,401 B2 12/2022 Kulkarni
11,582,425 B2 2/2023 Liu
11,639,134 B1 5/2023 Huizen et al.
11,780,372 B2 10/2023 Sobecki et al.
11,827,153 B2 11/2023 Miller et al.
2014/0336876 A1* 11/2014 Gieseke ............. G01C 21/3679 345/156
2015/0009010 A1* 1/2015 Biemer ................... G06F 21/32 340/5.83
2015/0015710 A1 1/2015 Tiryaki
2015/0022664 A1 1/2015 Pflug et al.
2015/0092042 A1 4/2015 Fursich
2015/0232030 A1 8/2015 Bongwald
2015/0294169 A1 10/2015 Zhou et al.
2015/0296135 A1 10/2015 Wacquant et al.
2015/0352953 A1 12/2015 Koravadi
2016/0137126 A1 5/2016 Fursich et al.
2016/0148065 A1* 5/2016 Lee ...................... G06V 10/141 348/78
2016/0209647 A1 7/2016 Fursich
2017/0217367 A1 8/2017 Pflug et al.
2017/0274906 A1 9/2017 Hassan et al.
2018/0222414 A1 8/2018 Ihlenburg et al.
2018/0231976 A1 8/2018 Singh
2019/0210615 A1 7/2019 Caron et al.
2020/0143560 A1 5/2020 Lu et al.
2020/0202151 A1 6/2020 Wacquant
2020/0320320 A1 10/2020 Lynam
2021/0291739 A1 9/2021 Kasarla et al.
2021/0323473 A1 10/2021 Peterson et al.
2022/0242438 A1 8/2022 Sobecki et al.
2022/0254132 A1 8/2022 Rother
2022/0377219 A1 11/2022 Conger et al.
2024/0168355 A1 5/2024 Baur
2024/0190456 A1 6/2024 P et al.
2024/0383406 A1 11/2024 Sobecki

* cited by examiner

ScenarioA
- 6cm between dummy head and mirror;
- Lowest power (64us +5A+only OMS ON)

ScenarioB

- 15cm between dummy head and mirror;
- highest power (4096us +2.32A+DMS and OMS ON)

ScenarioC
- 20cm between dummy head and mirror;
- highest power (4096us +2.32A+DMS and OMS ON)

VEHICULAR CABIN MONITORING SYSTEM WITH LIGHT CONTROL BASED ON OCCUPANT LOCATION

CROSS REFERENCE TO RELATED APPLICATION

The present application claims the filing benefits of U.S. provisional application Ser. No. 63/587,471, filed Oct. 3, 2023, which is hereby incorporated herein by reference in its entirety.

FIELD OF THE INVENTION

The present invention relates generally to a vehicle cabin monitoring system for a vehicle and, more particularly, to a vehicle cabin monitoring system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A vehicular cabin monitoring system includes a camera disposed within a cabin of a vehicle equipped with the vehicular cabin monitoring system and viewing within an interior cabin of the vehicle. The camera is operable to capture image data. The camera includes an imager, and the imager includes a CMOS imaging array having at least one million photosensors arranged in rows and columns. The system includes an electronic control unit (ECU) with electronic circuitry and associated software. The electronic circuitry includes an image processor operable to process image data captured by the camera. Image data captured by the camera is transferred to and is processed at the ECU. The system includes a light emitter operable to emit nonvisible light. Nonvisible light emitted by the light emitter, when electrically operated to emit nonvisible light, illuminates at least a portion of the interior cabin that is viewed by the camera. The vehicular cabin monitoring system, with the light emitter electrically operated to emit nonvisible light, and via processing at the ECU of image data captured by the camera and transferred to the ECU, determines illuminance of nonvisible light at a region of interest within the illuminated portion of the interior cabin that is viewed by the camera. The vehicular cabin monitoring system, responsive to determining that the illuminance of nonvisible light at the region of interest is greater than a threshold illuminance, reduces intensity of nonvisible light emitted by the light emitter.

These and other objects, advantages, purposes and features of the present invention will become apparent upon review of the following specification in conjunction with the drawings.

DESCRIPTION OF THE PREFERRED EMBODIMENTS

A vehicular cabin monitoring system operates to capture images interior of the vehicle and may process the captured image data to detect objects within the vehicle, such as to monitor an attentiveness of the driver of the vehicle. The cabin monitoring system includes an image processor or image processing system that is operable to receive image data from one or more cameras. The system includes one or more illumination sources, such as light emitting diodes (LEDs) or vertical-cavity surface-emitting lasers (VCSEL), that emit light to illuminate the field of view of the camera(s) in low light conditions.

Figure 1:
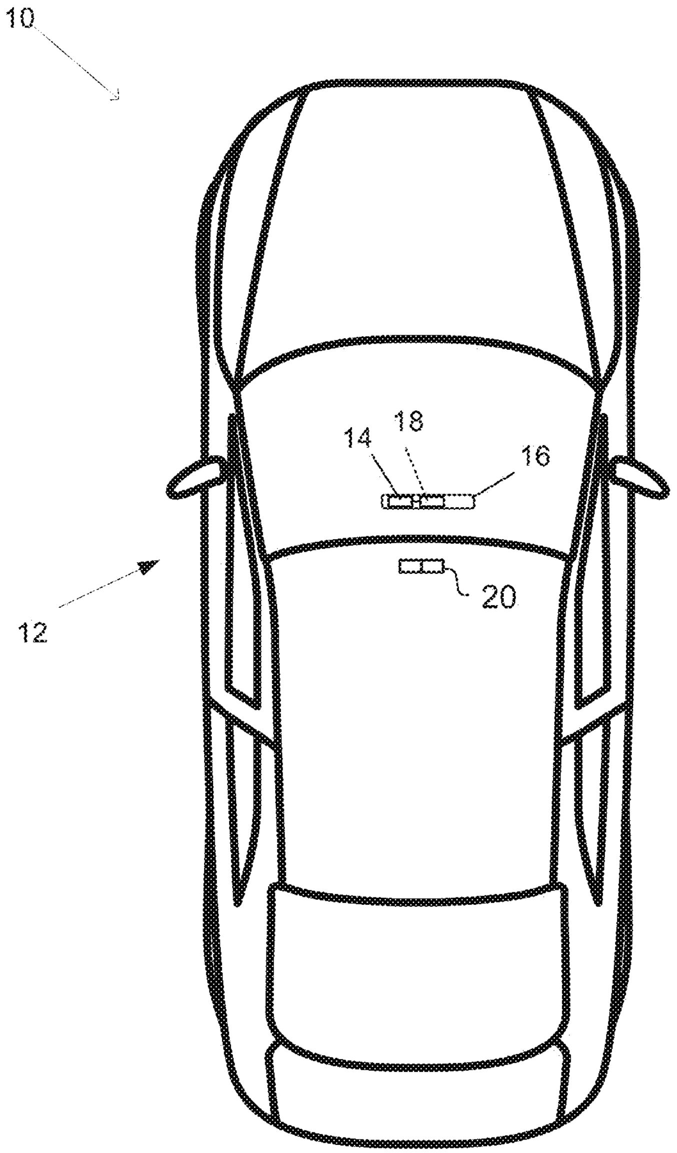
FIG. 1 is a plan view of a vehicle with a cabin monitoring system that incorporates one or more cameras.
Figure 2A:
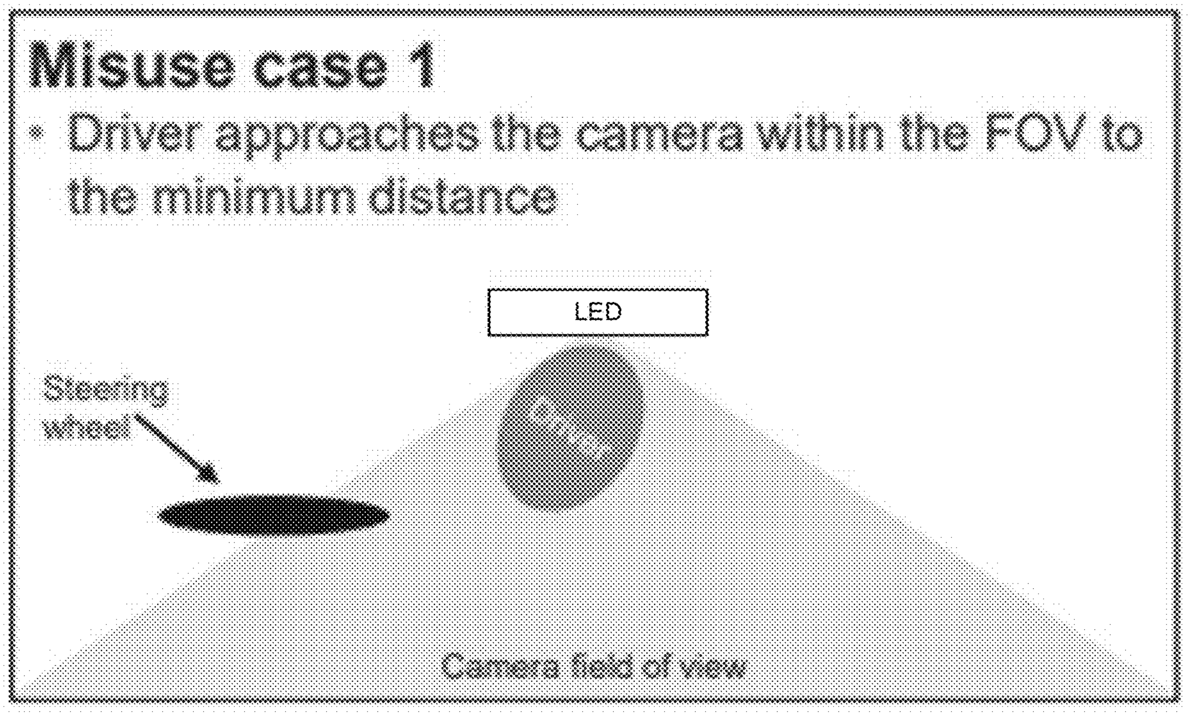
FIGS. 2A-2F are schematic views of different potential scenarios where an occupant of a vehicle is within a minimum distance of a camera or light emitting diode (LED) of a cabin monitoring system.
Figure 2B:
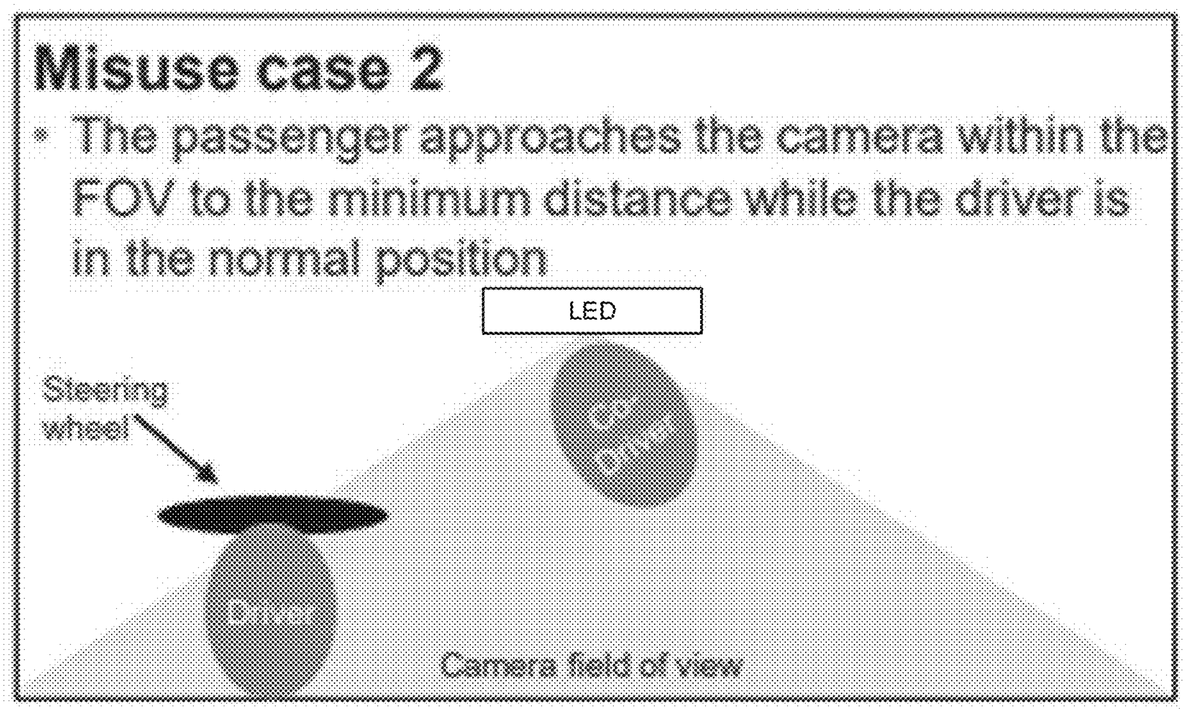
Figure 2C:
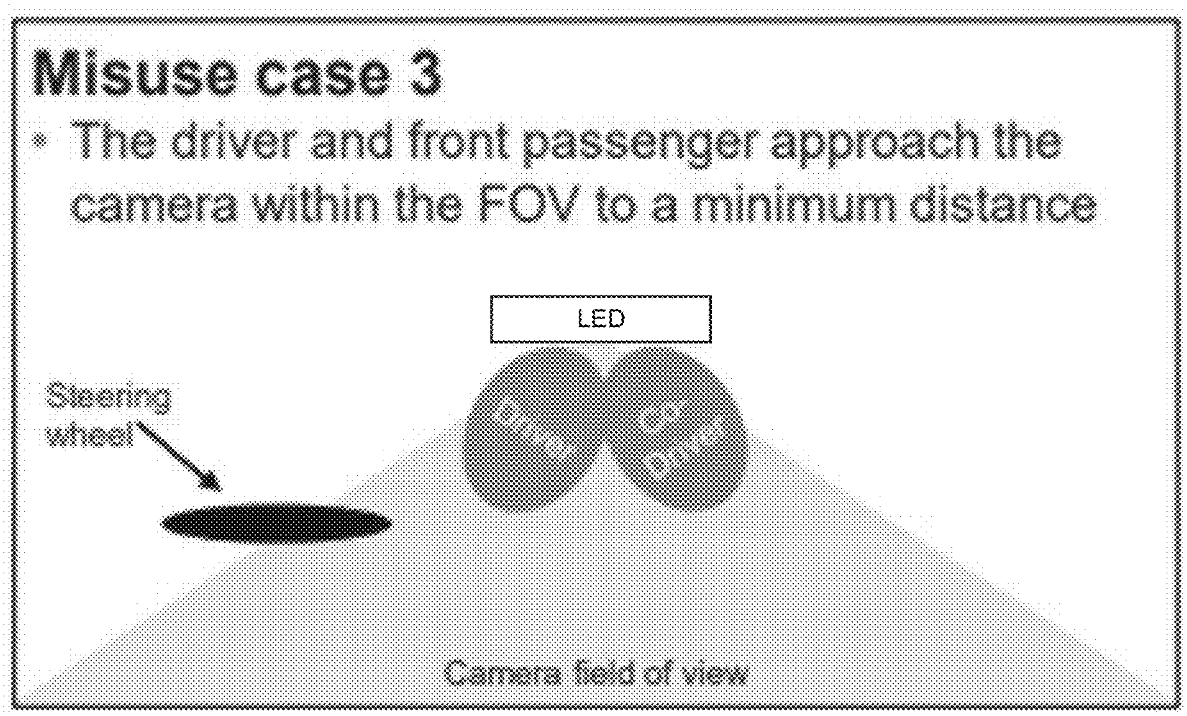
Figure 2D:
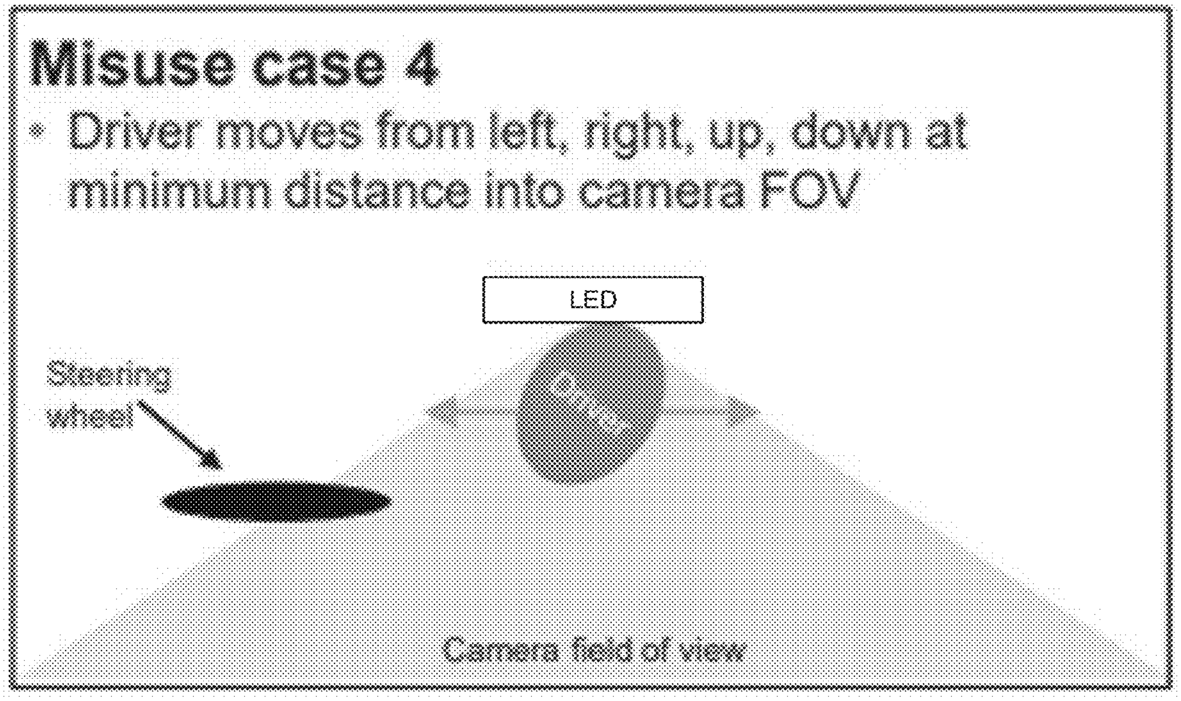
Figure 2E:
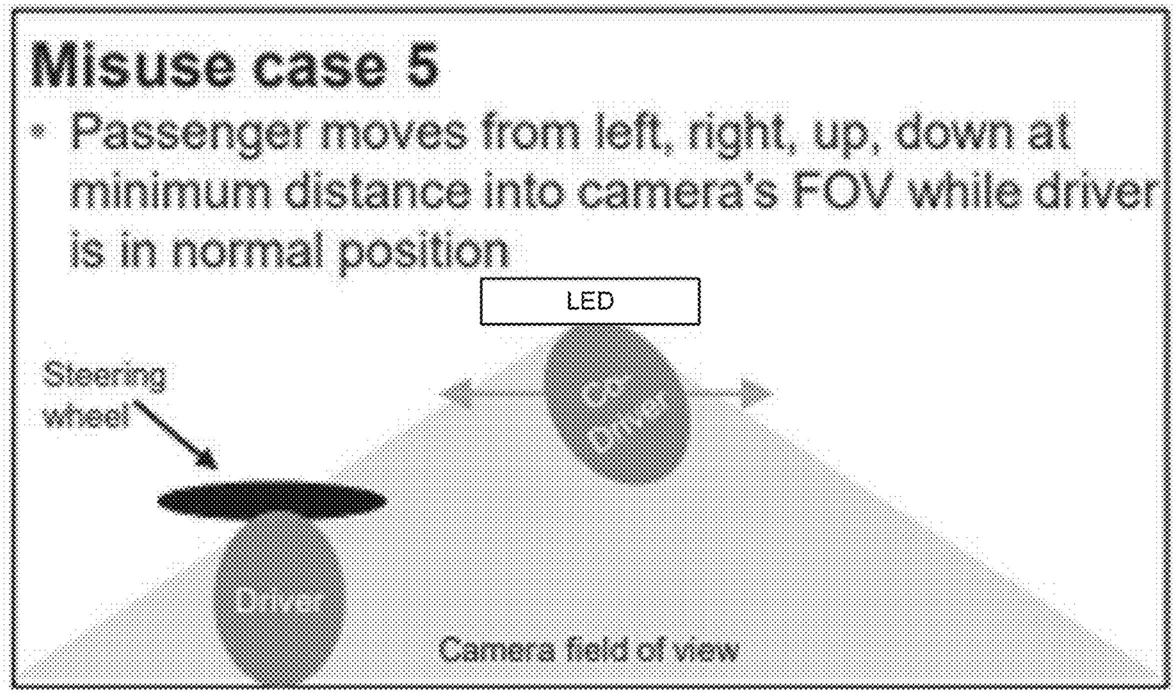
Figure 2F:
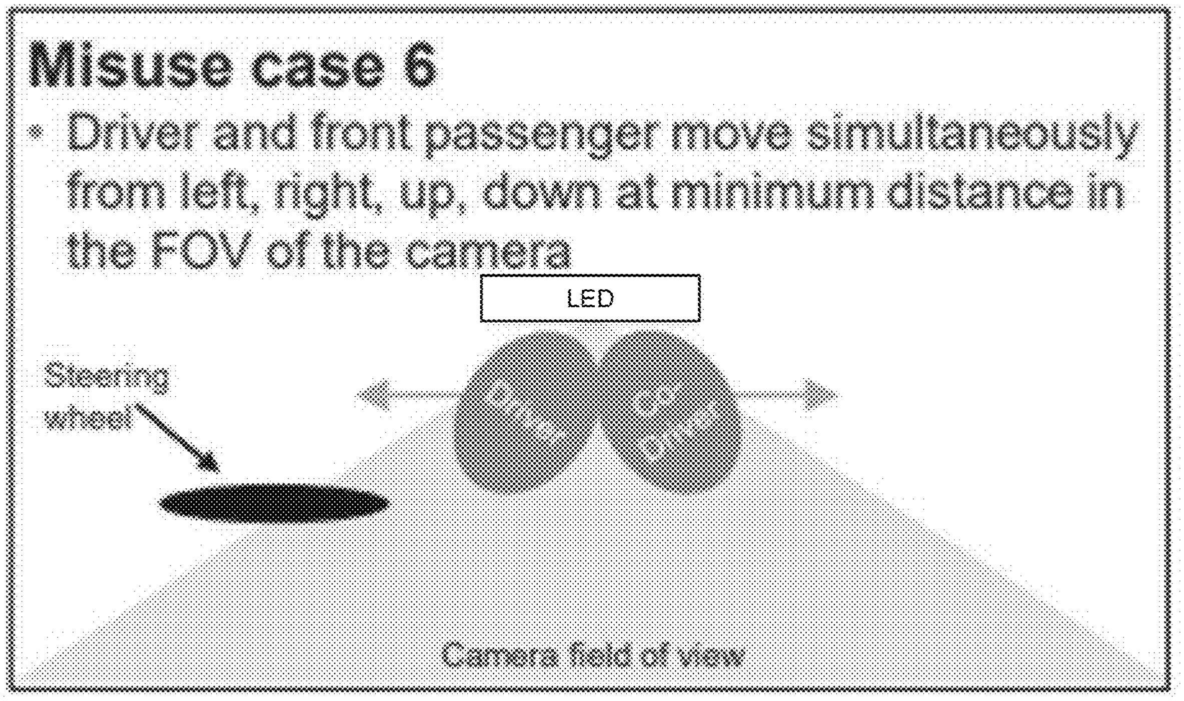

Referring now to the drawings and the illustrative embodiments depicted therein, a vehicle 10 includes a cabin monitoring system 12 that includes at least one interior viewing imaging sensor or camera, such as a camera 14 disposed at a rearview mirror assembly 16 of the vehicle (and the system may optionally include one or more cameras at other locations within the vehicle, such as at a windshield of the vehicle, at a headliner of the vehicle, at an instrument panel of the vehicle, etc.), which captures images interior of the vehicle, with the camera having a lens for focusing images at or onto an imaging array or imaging plane or imager of the camera (FIG. 1). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like (although shown in FIG. 1 as being part of or incorporated in or at an interior rearview mirror assembly 16 of the vehicle, the ECU may be disposed elsewhere at or in the vehicle). The data transfer or signal communication from the camera to the ECU may comprise any suitable data or communication link, such as a vehicle network bus or the like of the equipped vehicle.

The cabin monitoring system 12 includes one or more light emitters, such as two or more LEDs 20 (or other light sources) that are operable to emit light to illuminate the cabin of the vehicle for the camera 14 during low light conditions. For example, a first LED 20 illuminates the cabin for a driver monitoring function of the cabin monitoring system and a second LED 20 illuminates the cabin for an occupant monitoring function of the cabin monitoring system. The LEDs 20 may emit visible light or nonvisible light, such as infrared (IR) light or near-IR light. For example, the cabin monitoring system may include a light emitter (that includes one or more LEDs or other suitable illumination source) that, when electrically operated, emits near infrared light, and the camera may be sensitive to near infrared light, with the frame capture rate of the camera at least in part corresponding to the pulse rate of the near infrared light emitter. The light emitter may be located at any location within the cabin of the vehicle, such as at an interior mirror assembly, at a headliner/roof, at a central console, etc.

Cabin monitoring systems such as driver monitoring systems (DMS) and occupant monitoring systems (OMS) are vehicle safety systems that assess drivers or other occupants of a vehicle for any number of purposes. For example, a DMS may estimate or predict an alertness or drowsiness of a driver and take action (e.g., generate a warning) when the driver appears too drowsy to drive safely. As another example, an OMS may monitor for the presence and health of any occupant of the vehicle, such as when a child is left behind in a vehicle. These vehicles often rely on infrared (IR) or near-IR light LEDs to illuminate the cabin with non-visible light during low light conditions. However, for safety concerns, it is not recommended for these LEDs to shine directly into human eyes (i.e., when the eye is near the LED) at high levels of power, even though the emitted light is not visible to the human. Prolonged exposure to high-intensity IR light can potentially cause damage to the eyes.

Figure 3:
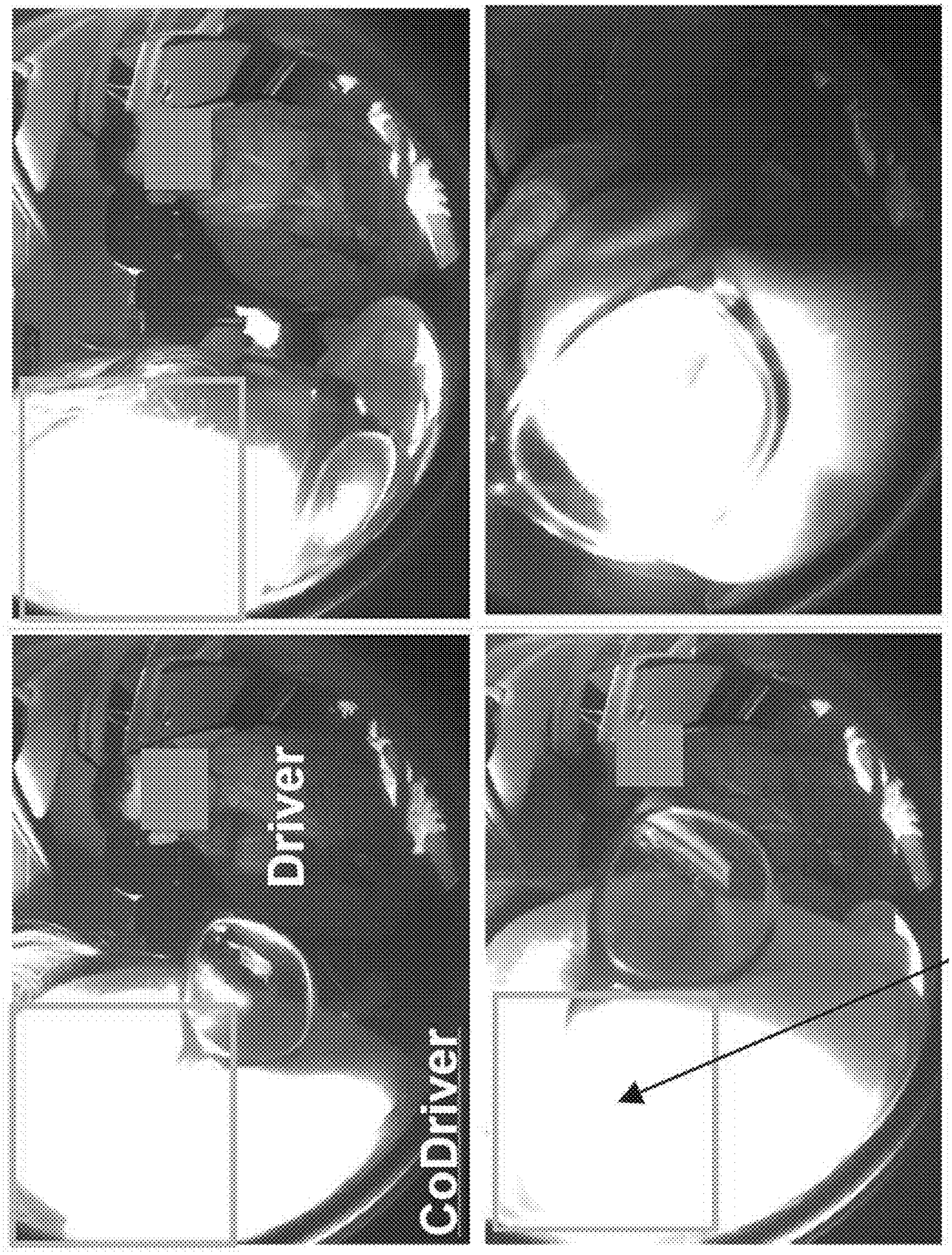
FIG. 3 shows images derived from frames of image data captured by a camera of a vehicular cabin monitoring system with an occupant of the vehicle within a minimum distance of the camera.

For example, as shown in FIGS. 2A-2F, several misuse cases can arise when a driver and/or an occupant of the vehicle position their head within a threshold distance of the IR source (e.g., one or more IR or near IR LEDs) where the eyes may be exposed to more intense IR light. For instance, as shown in FIG. 3, an occupant of the vehicle unwittingly receives direct exposure to the IR light when leaning forward toward the dash of the vehicle. Specifically, FIG. 3 illustrates the "Misuse case 2" of FIG. 2A and the "Misuse case 5" of FIG. 2E. Conventional solutions to these misuse cases rely on "blockage detection" to mitigate safety concerns. For example, when the camera cannot properly detect a human, the camera raises a "blockage" status and then the LED radiance is reduced. However, this blockage solution can be unreliable as the blockage status can be caused by other issues such as a dirty lens, camera, a broken lens, etc.

Implementations herein are directed toward systems and methods for preventing eye damage for IR and near-IR LED illumination sources (such as for camera-based DMS and OMS). The implementations include a vehicular cabin monitoring system that determines when an occupant (e.g., a driver or passenger) of the vehicle approaches the illumination source and reduces the radiation power (i.e., the amount of IR light emitted) to levels safe for human eyes. For example, the system may process image data captured by a camera to determine the brightness of photosensors or pixels in a specific area of interest (which represents the illuminance of the nonvisible light). If the brightness or illuminance exceeds a certain threshold, the system reduces the amount of nonvisible light emitted by the LEDs.

Figure 4:
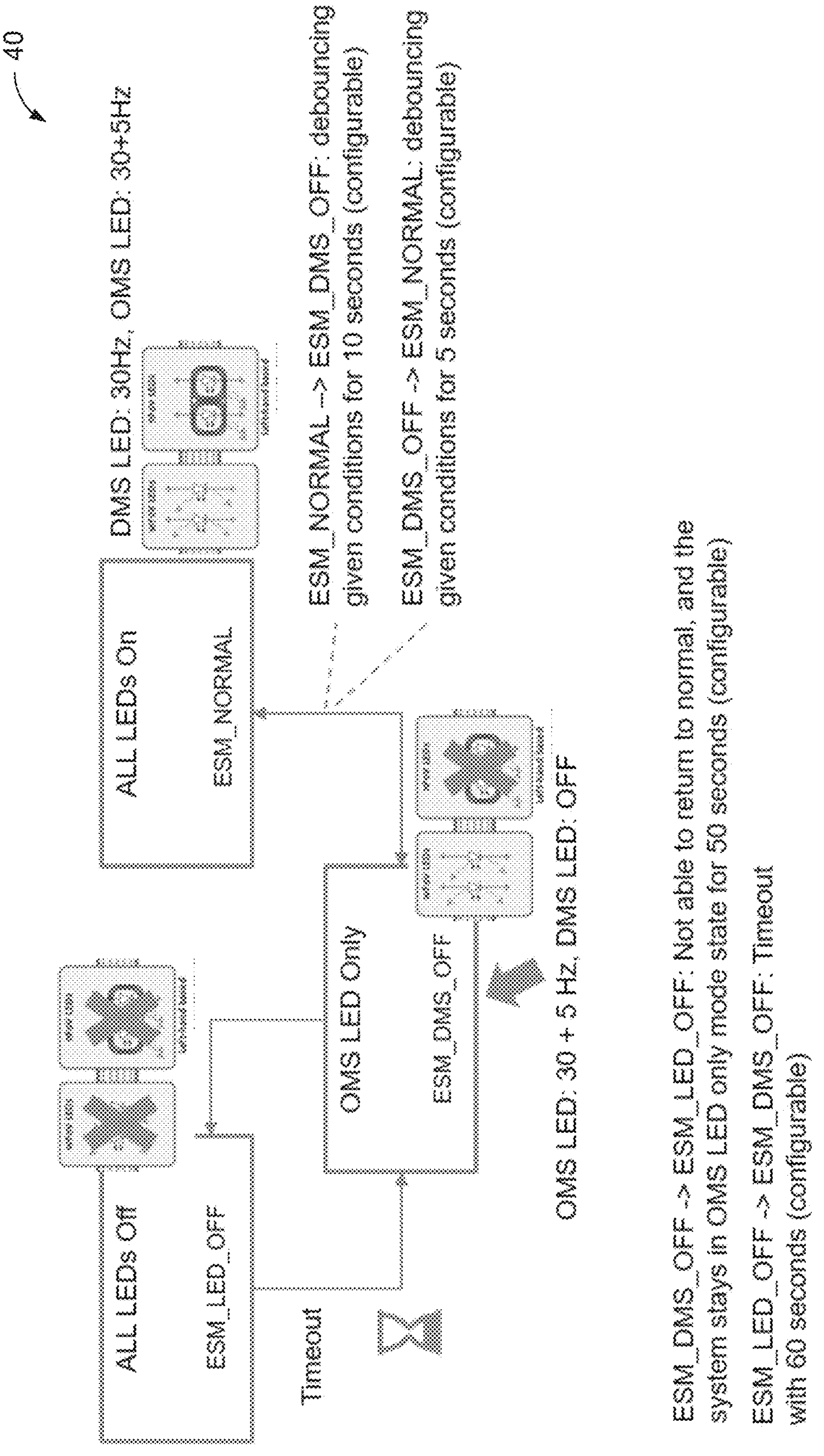
FIG. 4 is a state diagram of the cabin monitoring system of FIG. 1.

Referring now to FIG. 4, a state machine 40 for the vehicular cabin monitoring system 12 is illustrated. The vehicular cabin monitoring system has one or more DMS LEDs (or other illumination sources) for illuminating a driver of the vehicle and one or more OMS LEDs (or other illumination sources) for illuminating other occupants of the vehicle. The OMS LED may provide a wide field of illumination while the DMS LED may provide a relatively narrower field of illumination (FIG. 5) compared to the OMS LED. The system may utilize aspects of the systems described in U.S. Pat. Nos. 11,827,153; 11,780,372 and/or 11,639,134, and/or International Publication No. WO 2023/220222, which are all hereby incorporated herein by reference in their entireties.

The state machine 40 in this example has three states: an "ALL LEDs OFF" state, an "OMS LED Only" state, and an "ALL LEDs On" state. Each of these states dictates the operational behavior of the LEDs within the vehicular cabin monitoring system. In the ALL LEDs On state, both the DMS LED(s) and the OMS LED(s) are enabled/pulsed at respective frequencies (e.g., 30 Hz). The frequencies may be the same for both or different. Optionally, the frequencies are the same but there is a phase shift between the OMS LED pulsing and the DMS LED pulsing (e.g., a 180-degree phase shift). This phase shift can help in reducing interference or achieving specific lighting effects. The ALL LEDs On state may be the default operational state (i.e., the state the system is in during nominal operation).

In the OMS LED Only state, the OMS LED(s) may be operational (i.e., pulsing at a defined frequency, such as at 30 Hz) and the DMS LED is off or inactive (i.e., does not pulse or emit light at all). Conversely, in the ALL LEDs Off state, neither the OMS LED nor the DMS LED pulse or emit light.

The state machine 40 may transition from the ALL LEDs On state (i.e., the normal or default state) to the OMS LED Only state when, as described in more detail below, the system determines that a human head/face is approaching the LEDs. For example, the system determines that a head is approaching one or both of the DMS and OMS LEDs. Upon making this determination, the system transitions to the OMS LED Only state and subsequently turns off the DMS LED. In this OMS LED state, the system continuously monitors whether the head, particularly the eyes, is at risk from exposure to the OMS LED. If such a risk is detected, the system transitions to the ALL LEDs Off state, wherein both the DMS LED and the OMS LED are turned off to mitigate any potential harm.

In the ALL LEDs Off state, the system remains inactive for a configurable timeout period. This period can be set to various durations, such as at least 10 seconds, at least 30 seconds, or even up to 50 seconds, depending on the specific requirements of the application. After this timeout period elapses, the system automatically transitions back to the OMS LED Only state. During this state, if the system continues to detect a risk to the head or eyes from the OMS LED, it may transition back to the ALL LEDs Off state to ensure safety.

Alternatively, if during the OMS LED Only state the system determines that the risk is no longer present (indicating that the head has moved away from the LEDs), the state machine 40 may transition back to the ALL LEDs On state. This transition signifies a return to normal operation where all LEDs are active. The system's ability to dynamically transition between these states ensures that it can effectively manage and mitigate risks associated with human interaction with the LEDs while maintaining optimal functionality.

Optionally, the system determines whether a head is approaching the LEDs by determining the illuminance of the nonvisible light within a region of interest. For example, the system determines whether a head is approaching the LEDs based on a distribution of brightness values for photosensors or pixels in frames of image data captured by the camera while the LEDs emit or radiate IR or near IR light. This determination process may involve analyzing the brightness values in predefined regions of interest (ROIs) within each captured image. The system determines whether the distribution of brightness values satisfies (e.g., exceeds) a threshold value for at least a threshold period of time. The threshold period of time may be defined as at least a certain duration and/or a threshold number of sequential frames of image data. If the system finds that the brightness values satisfy this threshold condition, the system may adjust the amount of IR light emitted by the LEDs. For example, the system determines that the brightness in a given ROI exceeds a threshold value for at least 1 second (or any other threshold period of time), and, in response, reduces the amount of IR light emitted by the LEDs (e.g., by transitioning from the ALL LEDs On state to the OMS LED Only state). As another example, the system determines that the brightness in a given ROI is below a threshold value for at least 1 second, and, in response, increases the amount of IR light emitted by the LEDs (e.g., by transitioning from the OMS LED Only state to the ALL LEDs On state).

Figure 5:
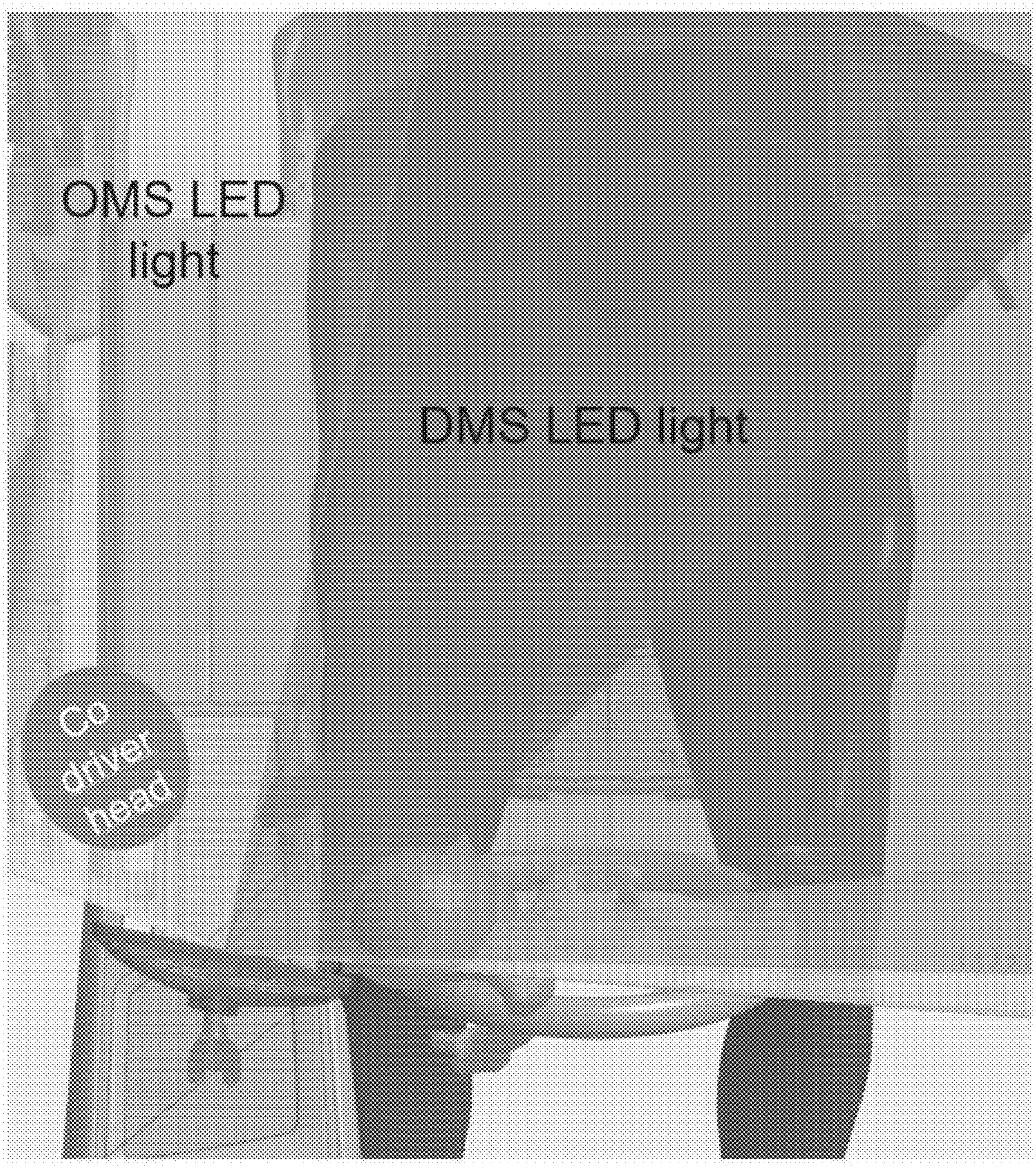
FIG. 5 is a plan view of fields of illumination of LEDs of a cabin monitoring system.

Optionally, the system determines the distribution of brightness within the ROI based on evaluating the percentage of photosensors or pixels within the ROI in one or more frames of image data that satisfy the threshold value (i.e., the quantity of photosensors or pixels "overexposed" or too bright within the ROI). For example, the system may decrease the amount of IR light emitted when over 70% of the photosensors or pixels within the ROI exceed the brightness threshold (i.e., are overexposed). As shown in FIG. 5, the system may first disable the narrow field of illumination provided by the DMS LED (i.e., by transitioning to the OMS LED Only state) and use the wider field of illumination provided by the OMS LED to continue to evaluate the risk to the occupants of the vehicle without use of the DMS LED.

When the system, while in the OMS LED Only state, determines that a risk continues to be present for an occupant of the vehicle (for example, the brightness of the ROI remains above the threshold level for another threshold period of time), the system may transition to the ALL LEDs Off state to disable all LEDs and eliminate the risk to the occupants of the vehicle. For example, if the system is in the OMS LED Only state for at least 10 seconds with the brightness within the ROI continuing to exceed a threshold (which may be the same threshold as the ALL LEDs On state or a different threshold), the system may automatically transition to the ALL LEDs Off state. The system may wait for a threshold period of time (e.g., a configurable timeout such as at least 20 seconds or at least 30 seconds, such as 50 seconds or 60 seconds) in the ALL LEDs Off state before transitioning back to the OMS LED Only state.

In this state, the system may again determine whether the risk to the occupants remains. If the risk remains, the system may return to the ALL LEDs Off state. If this risk is no longer present, such as when an occupant has moved away from the camera and/or LEDs, thereby reducing or eliminating the excessive brightness, the system may transition back to the ALL LEDs On state. In this state, all LEDs are reactivated, and normal operation resumes, provided that no further risks are detected. This dynamic adjustment between states ensures that the system continuously monitors and responds to potential hazards, maintaining a safe environment for all vehicle occupants.

In some examples, the "ALL LEDs On" and/or the "OMS LED Only" states have one or more sub-states that reduce power to the enabled LEDs such that the enabled LEDs emit less light. For example, the system achieves this reduction by reducing a current and/or a voltage supplied to the LEDs. The system may transition between these sub-states prior to transitioning between the primary states. For example, when the system is in the "ALL LEDs On" state, the system may transition from a full power sub-state to a reduced power sub-state to reduce an amount of power provided to the DMS LED(s) or all LEDs to reduce the amount of light emitted by the LEDs prior to transitioning to the OMS LED Only state. That is, the sub-states may act as "intermediate states" to reduce the amount of power provided to some or all of the LEDs prior to turning off the LEDs.

The transitions between these sub-states may be governed by the same parameters that control the transitions between the primary states (e.g., the distribution of brightness within the ROI, the threshold periods of time, etc.). The system may incorporate any amount debouncing between the states and sub-states of the state machine to manage these transitions effectively. Debouncing helps to prevent rapid, unintended switching between states and sub-states, which could otherwise lead to instability or flickering of the LEDs. The amount of debouncing applied can be configured according to the specific requirements of the application or the hardware used, allowing for customization based on different operational scenarios, vehicles, or user needs.

Figure 6A:
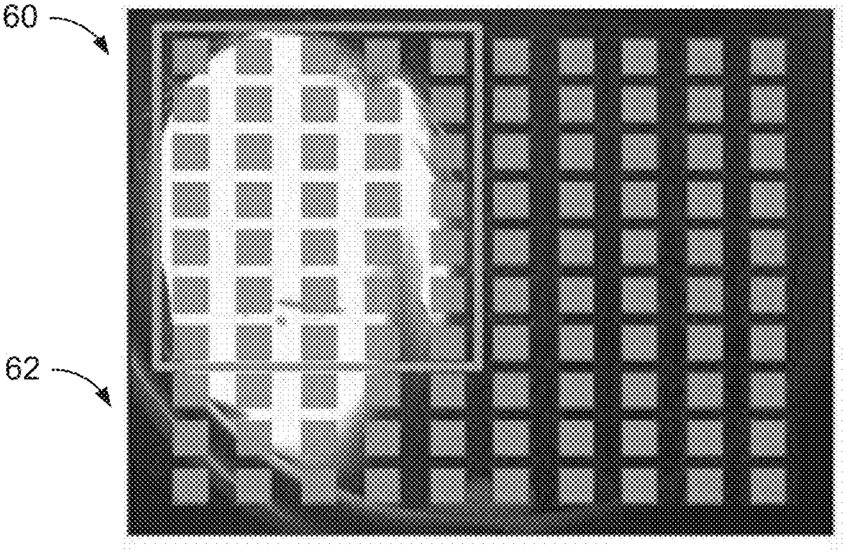
FIGS. 6A-6C show images derived from frames of image data captured by a camera annotated by a region of interest.
Figure 6A:
Figure 6B:
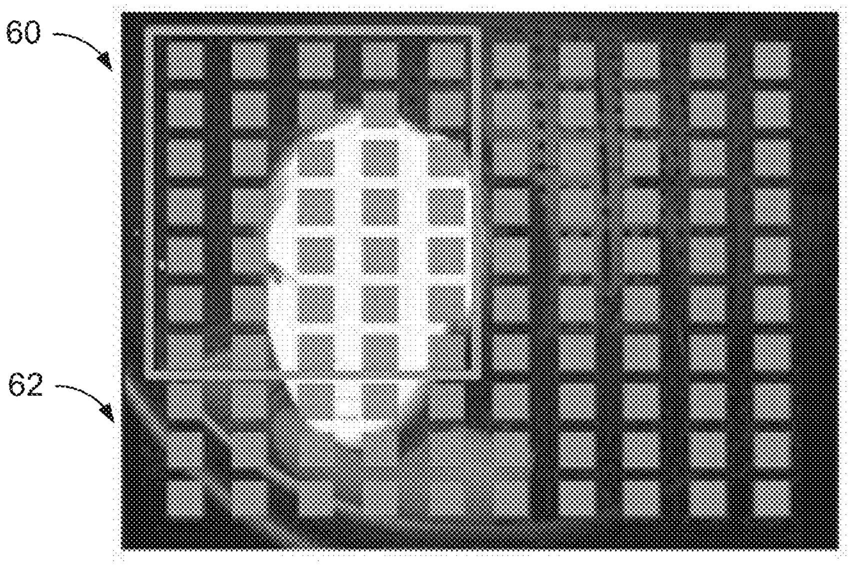
Figure 6B:
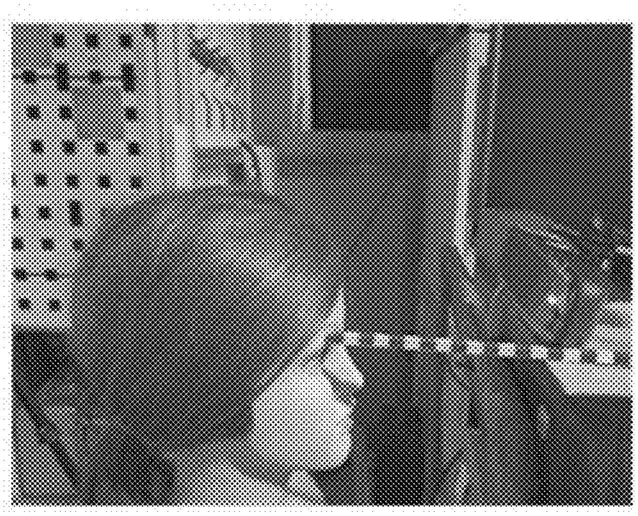
Figure 6C:
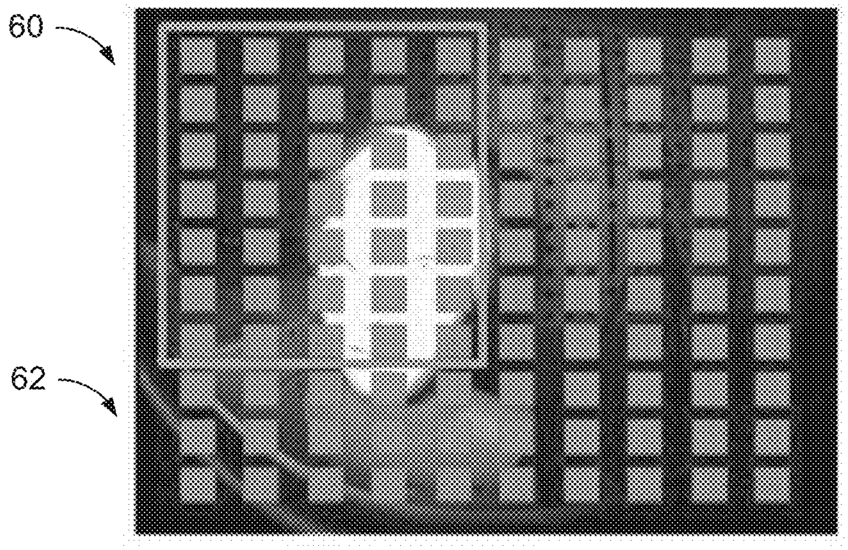
Figure 6C:
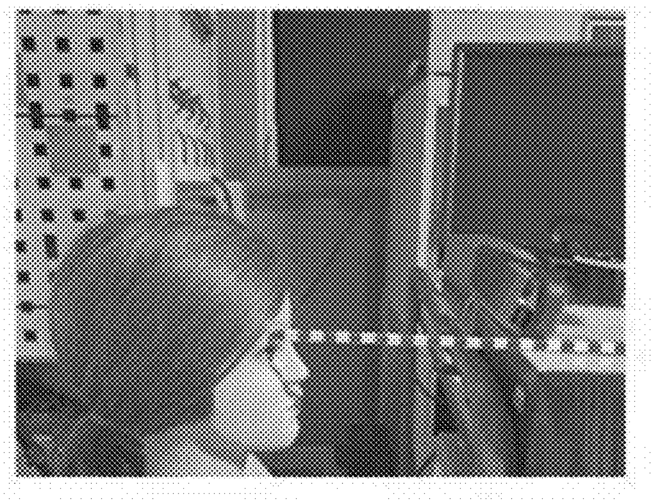

Referring now to FIGS. 6A-6C, a first scenario (FIG. 6A) is illustrated where a head is very near the LEDs (e.g., there is about 6 cm between the head and the camera). A ROI 60 (illustrated by a bounding box) surrounds a set of pixels 62 (which may represent a set of photosensors) that make up the captured image. Here, the brightness of pixels within the ROI 60 exceeds the threshold value, so the system, for example, transitions to the lowest power state with only the OMS LED enabled). In a second scenario (FIG. 6B), the head is further away from the LEDs (e.g., the head is about 15 cm from the LEDs), and the brightness of the ROI 60 has decreased to the point where the system enables both the DMS and OMS LEDs (i.e., high-power mode). In a third scenario (FIG. 6C), the head is even further away from the LEDs (e.g., the head is at least 20 cm from the LEDs) and the brightness in the ROI 60 decreases further, so the system remains in the high-power mode.

Figure 7:
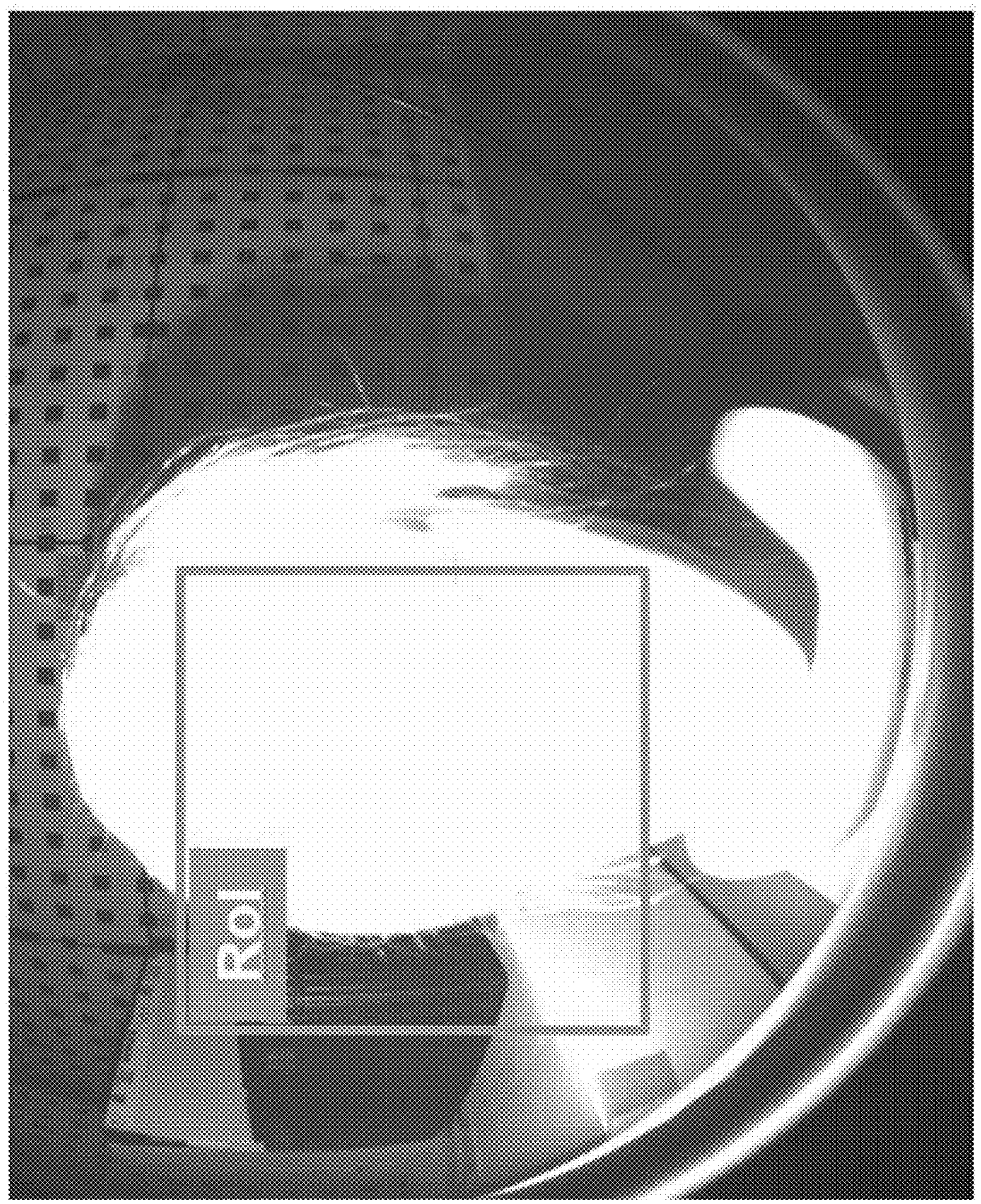
FIG. 7 shows another image derived from a frame of image data captured by a camera annotated by a region of interest.

Referring now to FIG. 7, the ROI boundary may be predefined base on various factors, such as a location of the LEDs in the cabin, a location of the camera in the cabin, a location of the light emitter within the cabin, an overall size of the vehicle, a specific configuration of the vehicle (e.g., whether the vehicle is left-hand drive or right-hand drive), or the like. The ROI boundary is strategically configured to encompass a portion of the field of view of the camera where a head must be positioned when in close proximity to the light emitter or LEDs. This ensures that the system can accurately capture and analyze the necessary image data.

For example, as illustrated in FIG. 7, when a head is very close to the OMS and/or DMS LEDs, the head appears significantly brighter in the captured image data due to reflections from the light. Accordingly, the ROI is specifically situated in this area to effectively monitor and capture relevant data. The position of the ROI may not be static. Instead, the position may be configurable or adjusted based on any of several parameters. These parameters may include Cartesian coordinates that represent the corners of the ROI, allowing for precise customization of its location within the field of view.

Other parameters may configure other aspects, such as a parameter to configure the threshold for brightness or overexposure of a single pixel or photosensor. This ensures that only pixels or photosensors exceeding a certain brightness level are considered overexposed. Another parameter may configure the percentage of pixels within the ROI that must be overexposed to trigger a state or sub-state change. In another example, a parameter may establish an amount of debouncing, which refers to the threshold period during which pixels must remain overexposed or underexposed before a change is registered. This helps in filtering out transient changes in brightness and ensures that only consistent and significant changes are considered.

Figure 8:
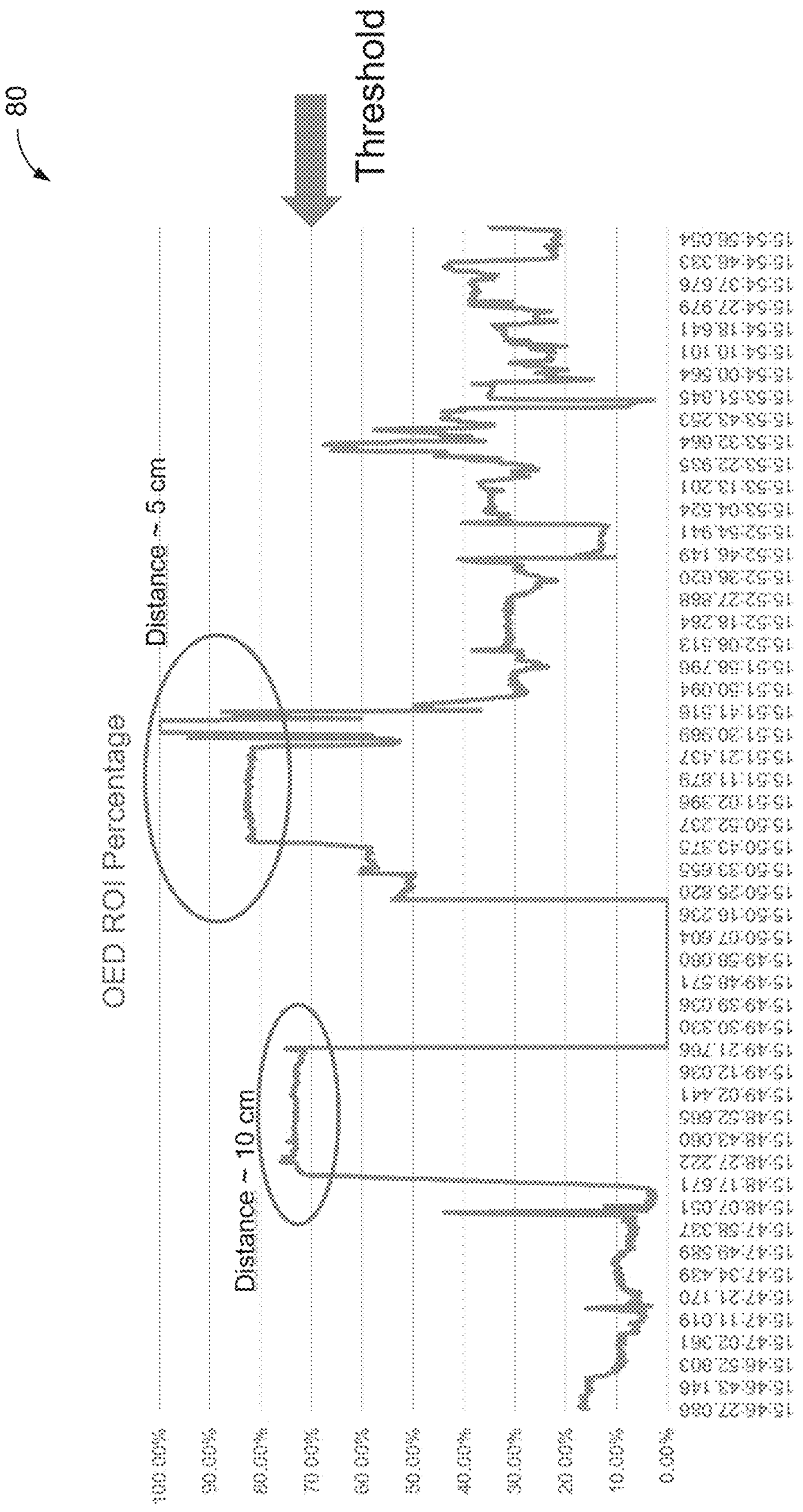
FIG. 8 is a graph of the exposure level of photosensors or pixels of a camera within a region of interest with an object at varying distances from the camera.

FIG. 8 includes a chart 80 plotting time along the x-axis and percentage of pixels or photosensors overexposed (based on the configurable brightness threshold) on the y-axis. In this example, the threshold percentage of pixels is 70%. That is, in this example, at least 70% of the pixels in the ROI must be overexposed to trigger a change. In this graph, the threshold is met when a head is 10 cm from the LEDs/camera, as the percentage of pixels that are overexposed in the ROI is ~73%. Additionally, when the head is 5 cm from the LEDs/camera, the percentage of pixels overexposed within the ROI grows to over 80%.

The size and positioning of the ROI may be configurable along with both the brightness value and the percentage of pixels within the ROI that must be overexposed based on use case and other environmental parameters of the system and vehicle. The performance of the system may be fine-tuned via careful calibration of these parameters.

Thus, implementations herein include a vehicular cabin monitoring system configured to enhance vehicle safety by monitoring the attentiveness of drivers and the presence and health of occupants. The system employs one or more cameras placed within the vehicle, such as at the rearview mirror assembly, windshield, headliner, or instrument panel, to capture images of the vehicle's interior. These images are processed to detect objects and monitor driver and occupant behavior. The system includes multiple illumination sources or light emitters, such as LEDs that emit visible or non-visible light (e.g., infrared or near-infrared light), to ensure proper illumination in low-light conditions. The light emitters may be placed at any appropriate location within the cabin of the vehicle, such as at the interior mirror assembly of the vehicle.

The system may dynamically adjust the intensity of the emitted light to prevent potential eye damage from prolonged exposure to high-intensity infrared light. For example, the system transitions between different operational states (e.g., ALL LEDs On, OMS LED Only, and ALL LEDs Off) based on the proximity of occupants to the LEDs. The system may use a state machine to manage these transitions, ensuring that the LEDs are turned off or their power is reduced when a human head is detected within a threshold distance. This approach mitigates risks associated with direct exposure to intense IR light while maintaining optimal functionality for monitoring purposes. Thus, the system detects when a human head is too close to the LEDs, which overcomes the problem in conventional solutions using blockage signals where, for example, a partial blockage results in a false negative (i.e., the system believes there is a blockage when no exists and the capabilities of the system are reduced).

Optionally, the system may perform facial recognition detection and/or eye recognition detection via processing of the captured image data to determine whether a face or eyes are approaching the light emitter or illumination source. For example, the system may reduce the intensity of the near infrared light emitted by the illumination source responsive to determining the threshold brightness and responsive to determining, via processing of image data captured by the driver monitoring camera, that a person's head or face or eyes are at or near or approaching the light emitter, and the system may not reduce the intensity of the near infrared light emitted by the illumination source when the system determines that a person's hand or other object is approaching the light emitter, regardless of the determined brightness. In other words, the system may reduce the intensity of the light emitter when the system (i) determines approach of a person's face toward the light emitter and (ii) determines that the brightness of light reflecting off the person's face is greater than a threshold level, which is indicative of the person's face/eyes being within a threshold distance to the light emitter.

The interior-viewing camera may be disposed at the mirror head of the interior rearview mirror assembly and moves together and in tandem with the mirror head when the driver of the vehicle adjusts the mirror head to adjust his or her rearward view. The interior-viewing camera may be disposed at a lower or chin region of the mirror head below the mirror reflective element of the mirror head, or the interior-viewing camera may be disposed behind the mirror reflective element and viewing through the mirror reflective element. Similarly, the light emitter may be disposed at the lower or chin region of the mirror head below the mirror reflective element of the mirror head (such as to one side or the other of the interior-viewing camera), or the light emitter may be disposed behind the mirror reflective element and emitting light that passes through the mirror reflective element. The ECU may be disposed at the mirror assembly (such as accommodated by the mirror head), or the ECU may be disposed elsewhere in the vehicle remote from the mirror assembly, whereby image data captured by the interior-viewing camera may be transferred to the ECU via a coaxial cable or other suitable communication line. Cabin monitoring or occupant detection may be achieved via processing at the ECU of image data captured by the interior-viewing camera. Optionally, cabin monitoring or occupant detection may be achieved in part via processing at the ECU of radar data captured by one or more interior-sensing radar sensors disposed within the vehicle and sensing the interior cabin of the vehicle.

The system may utilize aspects of driver monitoring systems and/or head and face direction and position tracking systems and/or eye tracking systems and/or gesture recognition systems. Such head and face direction and/or position tracking systems and/or eye tracking systems and/or gesture recognition systems may utilize aspects of the systems described in U.S. Pat. Nos. 11,827,153; 11,780,372; 11,639,134; 11,582,425; 11,518,401; 10,958,830; 10,065,574; 10,017,114; 9,405,120 and/or 7,914,187, and/or U.S. Publication Nos. US-2024-0190456; US-2024-0168355; US-2022-0377219; US-2022-0254132; US-2022-0242438; US-2021-0323473; US-2021-0291739; US-2020-0320320; US-2020-0202151; US-2020-0143560; US-2019-0210615; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or U.S. patent application Ser. No. 18/666,959, filed May 17, 2024, and/or U.S. provisional application Ser. No. 63/641,574, filed May 2, 2024, and/or International Publication No. WO 2023/220222, which are all hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Publication Nos. US 2010-0020170 and/or US-2009-0244361, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular cabin monitoring system, the vehicular cabin monitoring system comprising:

a camera disposed within a cabin of a vehicle equipped with the vehicular cabin monitoring system, the camera viewing within an interior cabin of the vehicle, wherein the camera is operable to capture image data;

wherein the camera comprises an imager, and wherein the imager comprises a CMOS imaging array having at least one million photosensors arranged in rows and columns;

an electronic control unit (ECU) comprising electronic circuitry and associated software, wherein the electronic circuitry includes an image processor operable to process image data captured by the camera;

wherein image data captured by the camera is transferred to and is processed at the ECU;

a light emitter operable to emit nonvisible light, wherein nonvisible light emitted by the light emitter, when electrically operated to emit nonvisible light, illuminates at least a portion of the interior cabin that is viewed by the camera;

wherein the vehicular cabin monitoring system, with the light emitter electrically operated to emit nonvisible light, and via processing at the ECU of image data captured by the camera and transferred to the ECU, determines illuminance of nonvisible light at a region of interest within the illuminated portion of the interior cabin that is viewed by the camera;

wherein the vehicular cabin monitoring system, responsive to determining that the illuminance of nonvisible light at the region of interest is greater than a threshold illuminance, determines, based on the captured image data, whether an object at the region of interest causing the illuminance to be greater than the threshold illuminance is a face or eyes of an occupant;

wherein the vehicular cabin monitoring system reduces intensity of nonvisible light emitted by the light emitter responsive to determining that the object is the face or the eyes of the occupant; and wherein the vehicular cabin monitoring system does not reduce the intensity of nonvisible light emitted by the light emitter responsive to determining that the object is not the face or the eyes of the occupant.

2. The vehicular cabin monitoring system of claim 1, wherein the light emitter comprises a plurality of light emitting diodes (LEDs).

3. The vehicular cabin monitoring system of claim 2, wherein a first LED of the plurality of LEDs, when electrically operated to emit nonvisible light, emits nonvisible light for driver monitoring, and wherein a second LED of the plurality of LEDs, when electrically operated to emit nonvisible light, emits nonvisible light for occupant detection, and wherein the first LED and the second LED are different.

4. The vehicular cabin monitoring system of claim 3, wherein the second LED has a wider field of illumination than the first LED.

5. The vehicular cabin monitoring system of claim 3, wherein the vehicular cabin monitoring system reduces intensity of nonvisible light emitted by the plurality of LEDs by disabling the first LED for driver monitoring and not disabling the second LED for occupant detection.

6. The vehicular cabin monitoring system of claim 5, wherein the vehicular cabin monitoring system, while the first LED is disabled and responsive to determining that the illuminance of nonvisible light at the region of interest is greater than the threshold illuminance for a threshold period of time, disables the second LED for occupant detection.

7. The vehicular cabin monitoring system of claim 2, wherein the vehicular cabin monitoring system reduces intensity of nonvisible light emitted by the plurality of LEDs based on adjusting power applied to at least one LED of the plurality of LEDs.

8. The vehicular cabin monitoring system of claim 2, wherein the vehicular cabin monitoring system reduces intensity of nonvisible light emitted by the plurality of LEDs by not powering at least one LED of the plurality of LEDs.

9. The vehicular cabin monitoring system of claim 1, wherein the region of interest is based on a location of the light emitter relative to the camera.

10. The vehicular cabin monitoring system of claim 1, wherein, after reducing intensity of nonvisible light emitted by the light emitter, and responsive to determining that the illuminance of nonvisible light at the region of interest continues to be greater than the threshold illuminance for at least a threshold period of time, the vehicular cabin monitoring system disables the light emitter.

11. The vehicular cabin monitoring system of claim 10, wherein the vehicular cabin monitoring system disables the light emitter for a second threshold period of time.

12. The vehicular cabin monitoring system of claim 1, wherein the determined illuminance of nonvisible light at the region of interest is greater than the threshold illuminance when a head of the occupant of the vehicle is within a threshold distance of the light emitter.

13. The vehicular cabin monitoring system of claim 1, wherein the vehicular cabin monitoring system determines that the illuminance of nonvisible light at the region of interest is greater than the threshold illuminance based on determining that at least a threshold percentage of photosensors sensing the region of interest have a respective brightness value that is greater than a threshold photosensor brightness.

14. The vehicular cabin monitoring system of claim 1, wherein the region of interest is determined via processing at the ECU of image data captured by the camera and transferred to the ECU.

15. The vehicular cabin monitoring system of claim 14, wherein, via processing at the ECU of image data captured by the camera and transferred to the ECU, the vehicular cabin monitoring system determines the eyes of the occupant of the vehicle.

16. The vehicular cabin monitoring system of claim 15, wherein the region of interest includes the eyes of the occupant of the vehicle.

17. The vehicular cabin monitoring system of claim 1, wherein the determined illuminance of nonvisible light is indicative that the object is within a threshold distance of the light emitter.

18. The vehicular cabin monitoring system of claim 17, wherein the object is the face of the occupant of the vehicle.

19. The vehicular cabin monitoring system of claim 1, wherein the camera is disposed at a mirror head of an interior rearview mirror assembly, and wherein the camera is movable together and in tandem with the mirror head when a driver of the vehicle adjusts his or her rearward view.

20. The vehicular cabin monitoring system of claim 19, wherein the light emitter is disposed at the mirror head.

21. The vehicular cabin monitoring system of claim 19, wherein the ECU is disposed at the interior rearview mirror assembly.

22. The vehicular cabin monitoring system of claim 19, wherein the ECU is disposed at the vehicle remote from the interior rearview mirror assembly.

23. The vehicular cabin monitoring system of claim 1, wherein the ECU receives radar data captured by an in-cabin radar sensor, and wherein the vehicular cabin monitoring system monitors the interior cabin of the vehicle at least in part via processing at the ECU of the received radar data.

24. A vehicular cabin monitoring system, the vehicular cabin monitoring system comprising:

a camera disposed at a mirror head of an interior rearview mirror assembly that is disposed within a cabin of a vehicle equipped with the vehicular cabin monitoring system, wherein the camera is movable together and in tandem with the mirror head when a driver of the vehicle adjusts his or her rearward view, and wherein the mirror head includes a mirror reflective element;

wherein the camera views within an interior cabin of the vehicle, and wherein the camera is operable to capture image data;

wherein the camera comprises an imager, and wherein the imager comprises a CMOS imaging array having at least one million photosensors arranged in rows and columns;

an electronic control unit (ECU) comprising electronic circuitry and associated software, wherein the electronic circuitry includes an image processor operable to process image data captured by the camera;

wherein image data captured by the camera is transferred to and is processed at the ECU;

a light emitter disposed at the mirror head;

wherein the light emitter is operable to emit nonvisible light, wherein nonvisible light emitted by the light emitter, when electrically operated to emit nonvisible light, illuminates at least a portion of the interior cabin that is viewed by the camera, and wherein the light emitter comprises a plurality of light emitting diodes (LEDs);

wherein the vehicular cabin monitoring system, with the light emitter electrically operated to emit nonvisible light, and via processing at the ECU of image data captured by the camera and transferred to the ECU, determines illuminance of nonvisible light at a region of interest within the illuminated portion of the interior cabin that is viewed by the camera;

wherein the vehicular cabin monitoring system, responsive to determining that the illuminance of nonvisible light at the region of interest is greater than a threshold illuminance, determines, based on the captured image data, whether an object at the region of interest causing the illuminance to be greater than the threshold illuminance is a face or eyes of an occupant;

wherein the vehicular cabin monitoring system reduces intensity of nonvisible light emitted by the light emitter responsive to determining that the object is the face or the eyes of the occupant; and wherein the vehicular cabin monitoring system does not reduce the intensity of nonvisible light emitted by the light emitter responsive to determining that the object is not the face or the eyes of the occupant.

25. The vehicular cabin monitoring system of claim 24, wherein a first LED of the plurality of LEDs, when electrically operated to emit nonvisible light, emits nonvisible light for driver monitoring, and wherein a second LED of the plurality of LEDs, when electrically operated to emit nonvisible light, emits nonvisible light for occupant detection, and wherein the first LED and the second LED are different.

26. The vehicular cabin monitoring system of claim 25, wherein the second LED has a wider field of illumination than the first LED.

27. The vehicular cabin monitoring system of claim 25, wherein the vehicular cabin monitoring system reduces intensity of nonvisible light emitted by the plurality of LEDs by disabling the first LED for driver monitoring and not disabling the second LED for occupant detection.

28. The vehicular cabin monitoring system of claim 27, wherein the vehicular cabin monitoring system, while the first LED is disabled and responsive to determining that the illuminance of nonvisible light at the region of interest is greater than the threshold illuminance for a threshold period of time, disables the second LED for occupant detection.

29. The vehicular cabin monitoring system of claim 25, wherein the vehicular cabin monitoring system reduces intensity of nonvisible light emitted by the plurality of LEDs based on adjusting power applied to at least one LED of the plurality of LEDs.

30. The vehicular cabin monitoring system of claim 25, wherein the vehicular cabin monitoring system reduces intensity of nonvisible light emitted by the plurality of LEDs by not powering at least one LED of the plurality of LEDs.

31. The vehicular cabin monitoring system of claim 24, wherein the camera and the light emitter are disposed at a lower region of the mirror head below the mirror reflective element of the mirror head.

32. The vehicular cabin monitoring system of claim 24, wherein the camera is disposed within the mirror head and views through the mirror reflective element of the mirror head.

33. A vehicular cabin monitoring system, the vehicular cabin monitoring system comprising:

a camera disposed within a cabin of a vehicle equipped with the vehicular cabin monitoring system, the camera viewing within an interior cabin of the vehicle, wherein the camera is operable to capture image data;

wherein the camera comprises an imager, and wherein the imager comprises a CMOS imaging array having at least one million photosensors arranged in rows and columns;

an electronic control unit (ECU) comprising electronic circuitry and associated software, wherein the electronic circuitry includes an image processor operable to process image data captured by the camera;

wherein image data captured by the camera is transferred to and is processed at the ECU;

a light emitter operable to emit nonvisible light, wherein nonvisible light emitted by the light emitter, when electrically operated to emit nonvisible light, illuminates at least a portion of the interior cabin that is viewed by the camera, and wherein the light emitter is disposed at a mirror head of an interior rearview mirror assembly;

wherein the ECU is disposed at the vehicle remote from the interior rearview mirror assembly;

wherein the vehicular cabin monitoring system, with the light emitter electrically operated to emit nonvisible light, and via processing at the ECU of image data captured by the camera and transferred to the ECU, determines illuminance of nonvisible light at a region of interest within the illuminated portion of the interior cabin that is viewed by the camera;

wherein the vehicular cabin monitoring system, responsive to determining that the illuminance of nonvisible light at the region of interest is greater than a threshold illuminance, determines, based on the captured image data, whether an object at the region of interest causing the illuminance to be greater than the threshold illuminance is a face or eyes of an occupant;

wherein the vehicular cabin monitoring system reduces intensity of nonvisible light emitted by the light emitter responsive to determining that the object is the face or the eyes of the occupant; and wherein the vehicular cabin monitoring system does not reduce the intensity of nonvisible light emitted by the light emitter responsive to determining that the object is not the face or the eyes of the occupant.

34. The vehicular cabin monitoring system of claim 33, wherein the region of interest is based on a location of the light emitter relative to the camera.

35. The vehicular cabin monitoring system of claim 33, wherein, after reducing intensity of nonvisible light emitted by the light emitter, and responsive to determining that the illuminance of nonvisible light at the region of interest continues to be greater than the threshold illuminance for at least a threshold period of time, the vehicular cabin monitoring system disables the light emitter.

36. The vehicular cabin monitoring system of claim 35, wherein the vehicular cabin monitoring system disables the light emitter for a second threshold period of time.

37. The vehicular cabin monitoring system of claim 33, wherein the determined illuminance of nonvisible light at the region of interest is greater than the threshold illuminance when a head of the occupant of the vehicle is within a threshold distance of the light emitter.

38. The vehicular cabin monitoring system of claim 33, wherein the camera is disposed at the mirror head of the interior rearview mirror assembly, and wherein the camera is movable together and in tandem with the mirror head when a driver of the vehicle adjusts his or her rearward view.

* * * * *